J. E. McCULLOUGH.
CAN TESTING MACHINE.
APPLICATION FILED OCT. 6, 1910.
1,003,769.
Patented Sept. 19, 1911.
5 SHEETS—SHEET 1.
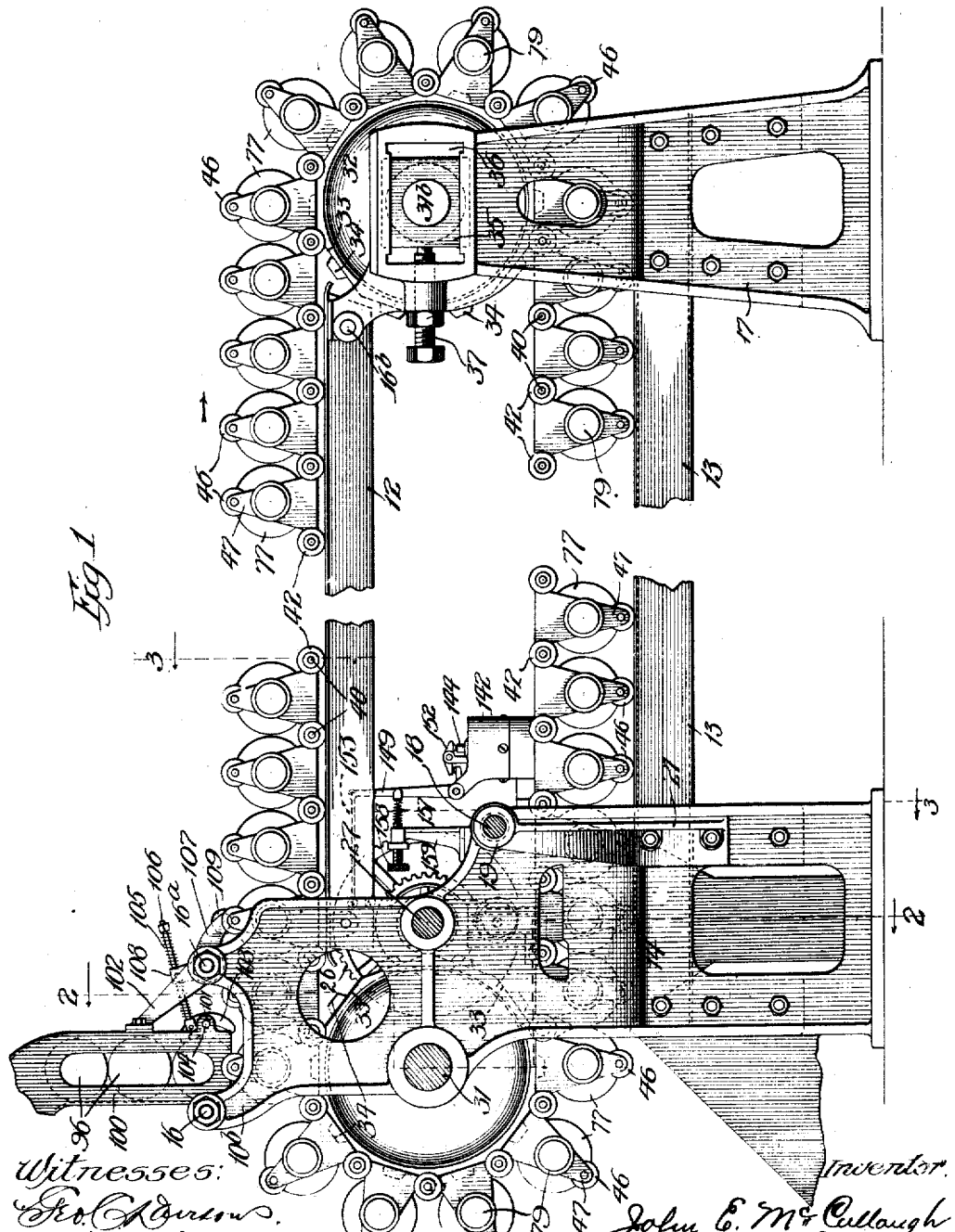

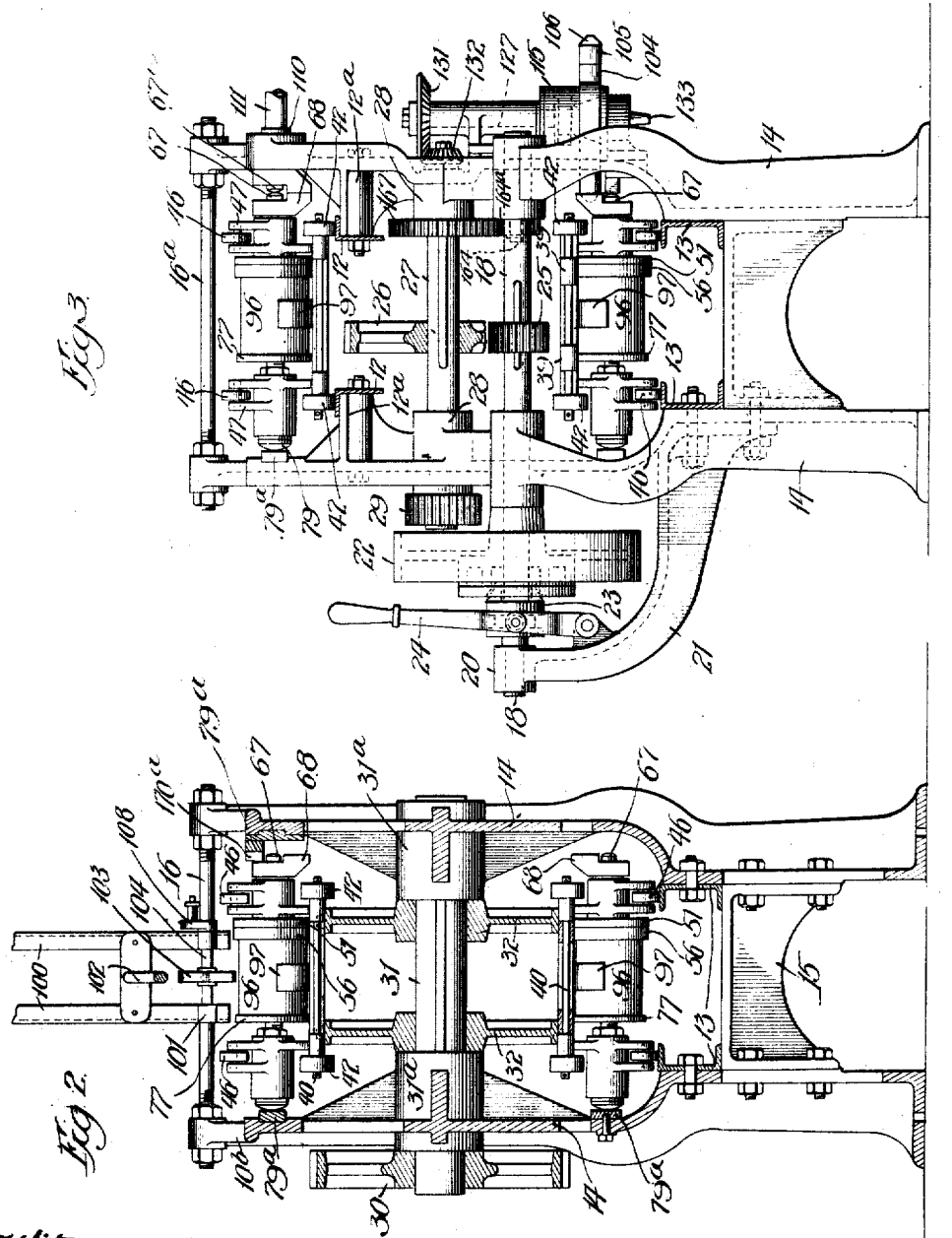

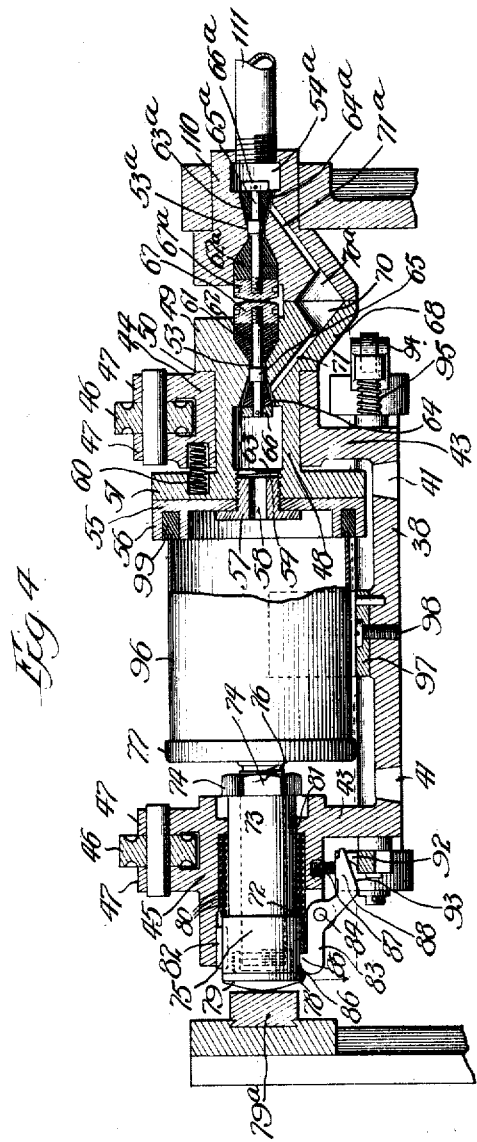

J. E. McCULLOUGH.
CAN TESTING MACHINE.
APPLICATION FILED OCT. 6, 1910.
1,003,769.
Patented Sept. 19, 1911.
5 SHEETS—SHEET 4.
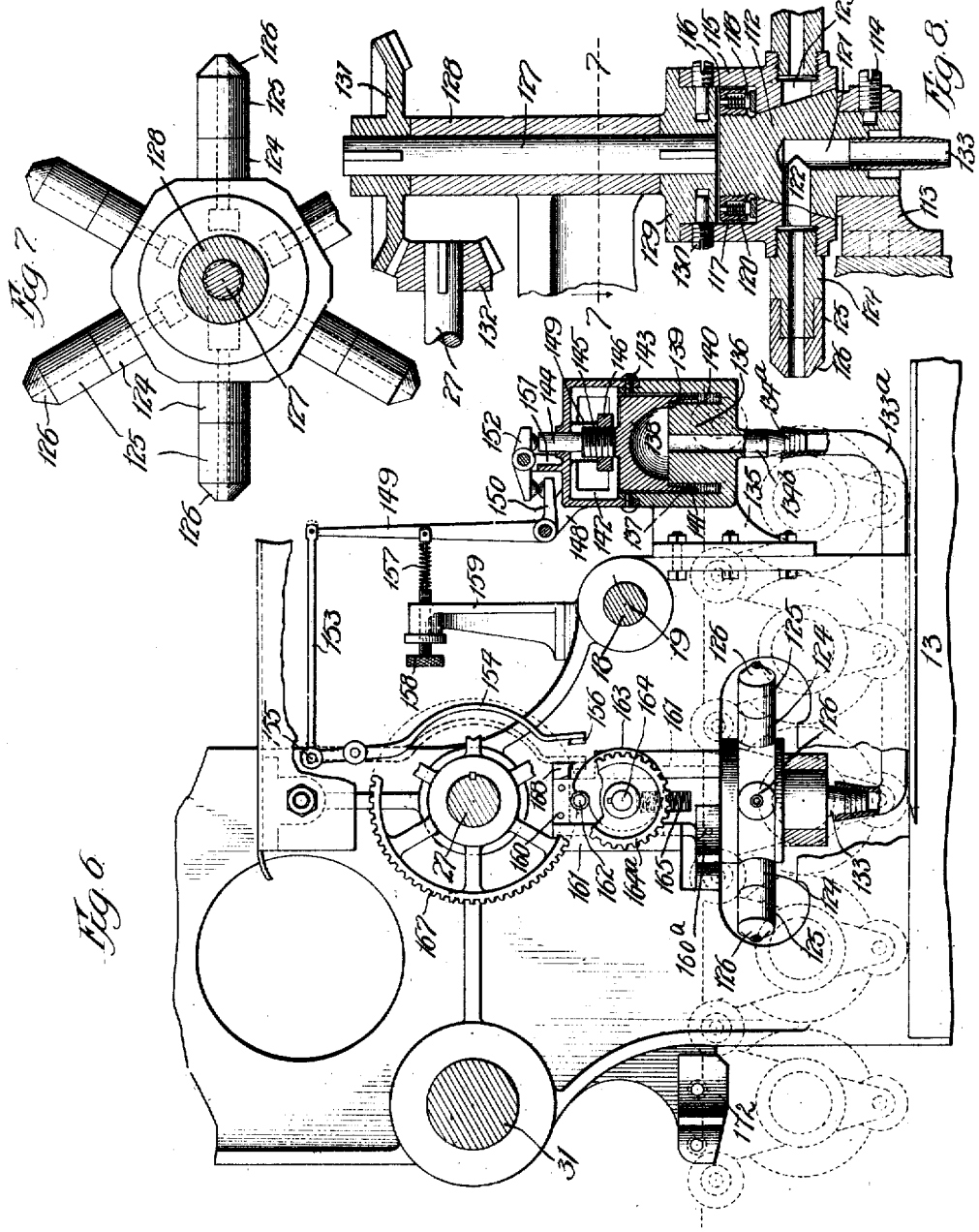

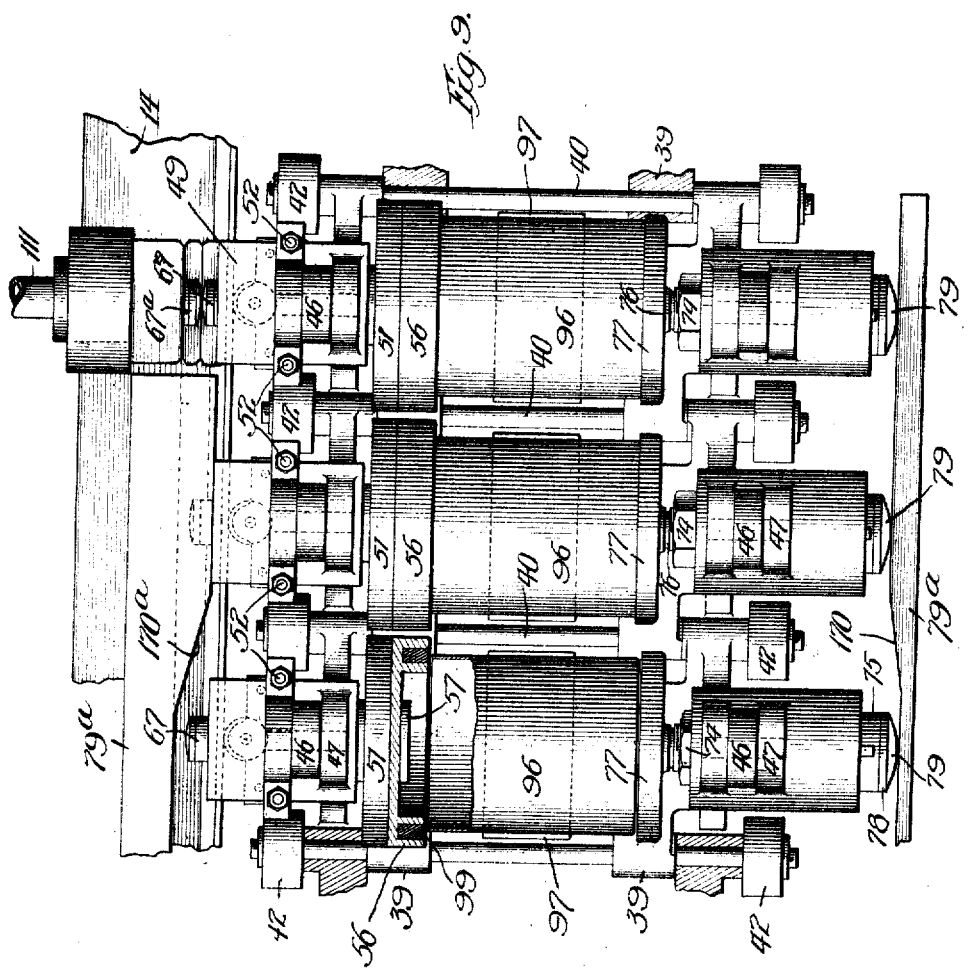

UNITED STATES PATENT OFFICE.

JOHN E. McCULLOUGH, OF CHICAGO, ILLINOIS.

CAN-TESTING MACHINE.

1,003,769.  Specification of Letters Patent.  Patented Sept. 19, 1911.

Application filed October 6, 1910.  Serial No. 585,606.

*To all whom it may concern:*

Be it known that I, JOHN E. McCULLOUGH, citizen of the United States, residing at Chicago, in the county of Cook and State of Illinois, have invented certain new and useful Improvements in Can - Testing Machines, of which the following is a specification.

My invention relates to improvements in machines for detecting the imperfections in the construction of tin cans or similar containers which cause them to admit air at the seams or joints.

The chief objects of the improvements which constitute the subject matter of this application are as follows:—to produce a machine of compact form that will handle a maximum number of cans in a minimum area of floor space and in the shortest time possible for proper testing conditions; to provide effective means for clamping and temporarily sealing the individual cans while under test; to provide sensitive and accurate means for automatically selecting and separating the defective or leaky cans from those properly constructed; to provide means whereby the air under pressure will be prevented from leaking after the cans have been sealed and charged.

In carrying out the aforegoing objects and others of general utility, I have invented a machine of the character described which comprises generally a main frame; wheels mounted on said frame; an endless belt traveling over said wheels and made up chiefly of a plurality of can closing and clamping elements; means for automatically applying closures to the cans; means for automatically feeding the cans singly from the holding chute to the clamping elements; means for admitting air under pressure through the clamping elements to the interior of the cans without leakage and means for automatically detecting and releasing imperfect or leaky cans, said means being operated through the lessening of the air pressure within the cans.

In the accompanying drawings which form a part of this application I have illustrated my invention in a preferred form of construction and arrangement in the following views:—

Figure 1 is a side elevation of a machine constructed according to my invention with a portion removed; Fig. 2 is a vertical cross-section on the line 2—2 of Fig. 1; Fig. 3 is a vertical cross-section on the line 3—3 of Fig. 1; Fig. 4 is an enlarged detail partly in section of the can clamping and carrying elements; Fig. 5 is an enlarged sectional detail of the can carrier; Fig. 6 is an enlarged elevational view of the can releasing mechanism and its adjacent and complementary parts viewed from the inner side; Fig. 7 is an enlarged plan view of my improved air delivery rotating head; Fig. 8 is a sectional detail showing the air delivery head and the method of driving same; Fig. 9 is a fragmentary top plan view of the conveyer and clamping elements with the cans in position; Fig. 10 is a fragmentary view on an enlarged scale of the cams for releasing the can-clamping means.

Referring to the details of the drawings, the numeral 12 indicates the upper and 13 the lower parallel frame members, arranged in pairs longitudinally of the machine. The upper members 12 are formed of angle bars supported on frame extensions 12ª, while channel beams are used for the members 13. The forward ends of the said members are supported upon a standard comprising side members or plates 14, joined together and firmly braced below by frame plates 15, and connected above by the rods 16, 16ª. The rear ends of the horizontal frame members are carried by a standard comprising side members or plates 17, also braced by plates 15, and having a single connecting tie rod 16ᵇ which passes through the rear ends of the upper frame members 12. Extending transversely between the sides of the front standard is a drive shaft 18, journaled in suitable bosses 19. One end of this drive shaft projects from the frame and is journaled in a box 20 carried on a bracket arm 21, bolted to the standard 14. Upon this drive shaft is loosely mounted a belt pulley 22, adapted to be operatively connected to the shaft by a friction clutch 23, operated by a hand lever 24 pivoted on the arm 21.

The drive shaft 18 carries a pinion 25, arranged about the median line of the frame and adapted to mesh with a gear 26, mounted on a counter shaft 27 journaled in boxes 28 on the front standard. One end of said countershaft projects upon the outside of the frame and has mounted thereon a pinion 29, meshing with a gear wheel 30 carried on the end of a sprocket shaft 31, journaled in boxes 31ª on the standard side plates 14.

This shaft 31 carries a pair of sprocket wheels 32, having straight faces 33, each face bearing a sprocket tooth 34. Upon a shaft 31$^b$ in the rear standard is mounted a similar pair of sprocket wheels 32 furnished in like manner with straight faces 33, and teeth 34. The sprocket shaft 31$^b$ for the rear wheels does not project through the frame, since the wheels which it carries are idlers, and its ends are journaled in boxes 35 arranged in apertures 36 in the standard members 17, and these boxes are adjusted in their slideways by set-screws 37. The purpose of the said sprocket wheels 32 is to drive an endless conveyer, or chain, made up of a plurality of units of special design linked together so as to form a continuous movable carrier, which receives the cans to be tested, and transports them successively from the loading chute to the releasing point, the said cans being subjected to the various steps required in the testing procedure as they travel. Each link or unit constituting the carrier or conveyer is composed of a base or link plate 38 (Figs. 4 and 5) of sufficient length to extend between the wheels of each pair of sprockets. The margins of said base plate are provided with projecting eyes or knuckles 39 through which are passed connecting rods 40, the eyes upon the opposite sides of the plate being in staggered relation and the knuckles of one plate abutting the knuckles of the adjacent plate so that all plates will bear the same relation to the conveyer, and be in perfect alinement. Each base plate is supplied with slots 41, with which the sprocket teeth 34 engage, and upon the extremities of the rods 40 are mounted anti-friction rollers 42, which travel upon the upper surfaces of the frame angle-bars 12, when the link units are in the upper course of their travel between the opposite pairs of sprockets, thus preventing sagging.

The ends of the base plates 38 are extended upwardly and outwardly to form angular flanges 43, which support cylindrical boxes 44, 45, in which are mounted can clamping means hereinafter described. Upon said boxes between ears 47 are arranged anti-friction rollers 46, the arrangement of the flanges and ears giving a triangular outline to the link member when viewed from the end, as shown in Fig. 1. The rollers 45 travel upon the upper flanges of the frame channel-bars 13, when said links or units are in the lower line of travel, the manner of engagement of both series of rollers being clearly shown in Fig. 1 in their different positions in the upper and lower courses.

The bearings upon both ends of the base or link plate 38 are bored horizontally to receive can clamping members, differing in the details of construction at the opposite ends. The clamping element shown upon the right hand end of the link plate 38, in Fig. 4, is termed, from its function, the closing head, and it is through this element that the can to be tested is charged with air under pressure. This closing head comprises a plunger 48, slidably mounted in the bore of the bearing or box 44 and extending entirely through the said box. The outer end of the plunger is provided with an enlarged head 49, forming a shoulder 50 which engages the outer face of the said box to limit the inward movement of the plunger 48 when the latter is in operative position. The inner end of the plunger is provided with an integral flange 51, and provision is made for assembling the plunger by making the box 44 in two parts, as in ordinary journal boxes, fastened together by bolts 52 (Fig. 9). The plunger is furnished with an axial bore 53, the inner end of which is enlarged by a counterbore 54. Upon the inner face of the flange 51 is applied a closing disk 55 provided with an annular ledge or flange 56. The said disk is bored centrally and threaded to receive a flanged plug 57, having a central hole 58, which communicates at one end with the bore 54 of the plunger. The inner end of the plug 57 projects through said disk 55 and engages threads in the inner end of the plunger 54, thus maintaining the disk 55 in apposition with the flange 51 of the plunger. The latter is held in a retracted position with the shoulders 50 in contact with the box 44, by a plurality of concentrically arranged coiled springs 60 which engage sockets in the approximate faces of the box and flange 51. The inner and outer ends of the bore 53 of the plunger are made conical to form seats for similarly shaped members which will now be described. The outer conical seat 61 is closely fitted with an elastic plug or cushion 62 preferably formed of rubber. The inner conical seat 63 has seated therein a suitable conical valve 64, also made of rubber in an elastic state. The elastic cushion 62, and the rubber valve 64 are joined by a stem 65, having its middle portion enlarged to slidably fit in the said bore 53. The ends of the said stem project through the valve and cushion, the inner extremity having a fixed collar, or head 66, while the outer end is provided with a nut 67, having its outer face made convex for a purpose that will be explained. The plunger head 49 has an extension 68 upon the lower side and in this extension is a conical depression 70, which communicates through a duct 71 with the valve seat 63. The bearing or boxing 45 at the opposite end of the link plate 38 is provided with a central bore 72 in which is slidably mounted a plunger 73 consisting of a hollow cylinder or shell having a squared-head 74 upon the inner end and furnished with a wide collar 75 upon the outer end. The bore of said shell is internally threaded to receive a threaded stem 76 which projects beyond the inner end of the said shell and is supplied at the end with a circular can clamping disk 77 approximating in diameter the disk 55 previously mentioned. The outer end of the bore of the shell is closed by a threaded plug 78, having its end face made convex, as shown at 79. The plunger 73 is urged outwardly by a coiled spring 80 which abuts at one end against the shoulder formed by the collar 75, and at the other engages an annular flange 81, projecting inwardly from the inner wall of the bore. The said plunger is held from turning in its bearing by a key 82 which does not interfere with the sliding movement. The plunger is held in extended position against the action of the spring 80 by a latch or dog 83, pivoted at 84, and having a projection or tooth 85 adapted to engage the end of a longitudinal slot 86, formed in the collar 75. The dog 83 is held in its engaging position by a spring 87 which is lodged in a socket in the under side of the bearing 45 and engages the inner end 88 of the said dog. The latter is disengaged from the slot 86 by pressing its inner end upward by the action of a release frame arranged as follows:—Extending longitudinally through suitable holes in the link plate 38 are a pair of rods 89, connected at the opposite ends by cross-bars 90, 91. The bar 90 lies directly beneath the inner end of the said dog and has a lug 92 adapted to engage an inclined face 93 formed on the under side of the end 88. The opposite cross-bar 91 is provided with an anti-friction roller 94, and the release frame is held in a retracted position by coiled springs 95. It will be readily seen that when sufficient pressure is made against the roller 94 to compress the springs 95, the lug 92 will press the end 88 of the dog upward and release the plunger 73.

The function of the disks 55 and 77 is to clasp or clamp the ends of the can to be tested. In Fig. 4 a can 96 is shown held in clamped position between the said disks. The can is supported in a holder or cradle consisting of a semi-circular plate 97, adapted to fit the curvature of the cans and removably secured to the link plate 38, midway between the flanges 43, by a set screw 98. This permits cradles of different dimensions to be used to suit variations in the sizes and shapes of the cans. The latter are held in the position shown in Fig. 4, the bottom being toward the disk 77 while the margin of the open end or top of the can engages an annular rubber ring 99 or other elastic material, set in a groove in the flange 56 of the disk 55. Adjustment is made for cans of different length by turning the threaded stem 76, so that when the plunger is held by the dog 83 it will press with sufficient force against the elastic ring 99. The dog is made to engage the collar 75 by forcing the plunger inwardly at the proper time by means of a cam 79ª fixed on the frame.

Secured to the front standard is a can feeding hopper or chute comprising a pair of channeled or grooved frame pieces 100 (Figs. 1 and 2) having eyes 101 through which the tie rod 16 passes, a diagonal brace 102, supported at the lower end upon the other tie rod 16ª, holding the chute firmly in an upright position. The cans are placed in said chute one above the other, as shown in the drawing, the ends of the cans engaging the channels in the end pieces 100. The cans descend in the chute by gravity and their travel downward is controlled by a detent 103 pivoted at 104 to the side of the chute, and held in engagement with the lowermost can in the chute, by a coiled spring 105 mounted on a rod 106 pivoted to the upper end of said finger 103. The latter is operated to disengage it from the can by means of a trip arm 107, pivoted on the rod 16ª. The upper end 108 of the trip arm is pivoted to the said rod 106 and the lower end of the trip projects into the path of the disks 77, the extremity of the trip being supplied with a roller 109 to reduce friction.

Mounted upon one side of the frame on a level with the upper course of the endless conveyer, is a charging head (Figs. 3, 4, and 9) through which air under pressure is introduced into each can as it travels by this point. This charging head comprises a cylinder 110 which is a duplicate of the right hand or outer end of the plunger 48, the only difference being in the contraction of the chamber 54ª, and the introduction therein of the threaded end of an air supply pipe 111. For the purpose of differentiating these duplicate devices the parts comprising the charging head are given distinct reference numerals. Thus the character 53ª designates the center bore, 62ª the rubber cushion, and 63ª the valve seat, fitted with a suitable rubber valve 64ª. The said cushion and valve are connected by a valve stem 65ª, having the cushion retaining head 66ª at one end, while the other end is furnished with a nut 67ª to hold the valve in place. The lower portion of the cylinder 110 is furnished with an extension having a cone shaped chamber 70ª communicating with the valve seat 63ª by a duct 71ª.

Arranged upon the front standard is a leak detecting device comprising a rotary valve which, with its coöperating mechanism, is shown in Figs. 6, 7, and 8. The said device comprises a cone shaped plug or valve seat 112 mounted in a vertical position in a bracket 113 attached to the standard, a set screw 114 holding the plug firmly in its socket in the bracket. Surrounding said plug 112 and adapted to rotate thereon, is a hollow cylindrical valve 115, the upper portion of which is counterbored, as indicated at 116, forming a chamber into which the upper end of the said plug projects. The valve is retained on its seat by a collar or ring 117, having threaded connection with the end of the plug and said ring carries a series of plungers 118, mounted in sockets in the ring, and pressed against the bottom of the chamber 116 by springs 120. The plug 112 has an axial bore 121, extending from the lower surface partly through the member then taking a horizontal course as indicated at 122, and opening upon the conical face of the plug. The body of the valve 115 is provided with a plurality of spaced apertures 123 adapted to register successively with the bore 122 when the valve is located. Into each aperture 123 is inserted an elongated nipple 124, having a soft rubber tip 125 secured to the outer end, the extremity of the tip being made rounded or cone shaped as shown at 126. The valve 115 is rotated by means of a shaft 127 mounted in a vertical bearing 128, carried by the frame. Upon the lower end of said shaft is keyed a flanged collar 129, which is inserted into the counterbore 116 of the valve and secured therein by set screws 130. The upper end of the shaft above the bearing 128 carries a bevel gear wheel 131 which receives motion from a pinion 132, borne on the end of the previously mentioned countershaft 27. A short pipe 133 is inserted into the lower end of the valve seat or plug 112, and forms a continuation of the duct or bore 121.

Arranged adjacent the rotary valve above described is a cylinder or cup 134, supported by an integral bracket 135 to the frame of the machine. Projecting upward from the bottom of this cup is a cylindrical boss 136, nearly as wide as the cup cavity, so that there remains a comparatively narrow annular space 137 between the boss and the cup wall. Projecting downward from the cup is an extension 134ª, having a bore 134ᵇ which extends entirely through the boss. The extension 134ª is connected with the pipe 133 by a pipe 133ª, having upturned flaring ends which receive the tapering ends of the extension 134ª and pipe 133 to form suitable air tight couplings. Arranged within the cup 134 is a plunger 138, hollowed out upon the under side giving it the form of an inverted cup or bell which fits over the boss so that its margin projects downward into the annular space 137. The inner surface of the plunger is provided with a shoulder 139, adapted to rest upon the margin of the said boss. The space surrounding the boss is partially filled with mercury 140 into which the lip 141 of the plunger dips, the mercury thus forming a seal between the bore 134ᵇ and the interior of the cup. The cup or cylinder 134 is provided with a closely fitting cap 142, secured to the body of the cup by screws 143. The said plunger 138 is furnished with a stem 144 which projects through a central aperture in said cap, and is provided within the cap with threads 145 engaged by an adjusting nut 146. A coiled spring 147 surrounds the stem 144 above said nut and tends to urge the plunger downward. Extending upward at an angle from the margin of the cap 142 is a bracket 148 upon which is pivotally mounted a bent lever 149. The lower end 150 of this lever is comparatively short and extends horizontally toward the stem of the plunger. Rising vertically from the cap 142 is a bracket 151 upon which is rockably mounted a lever 152, one end of which bears upon the short arm 150 of the lever 149, and the other is in contact with the upper end of the plunger stem 144. The upper end of the lever 149 is pivotally connected by a link 153 with a detent lever 154, pivoted to the frame at 155, and provided at its lower end with a hook or tooth 156. The initial position of the lever 154 can be varied by adjusting a tensioning spring 157 which is attached at one end to the lever 149, and at the other to a screw 158, mounted in a bracket 159. The purpose of the lever 154 is to control the can releasing devices at the testing place, it being necessary to prevent all defective cans from being carried beyond the point. To accomplish this a slide 160 is arranged to move vertically in ways 161 and is supported by a roller 162 which rests upon the periphery of a disk cam 163 carried by a shaft 164, against the action of a spring 165 which tends to hold the roller 162 in contact with said cam. The shaft 164 receives motion through a pinion 160 from a gear 167 mounted on the counter shaft 27. The upper end of the slide is furnished with a lateral projection 168 and the hook 156 is adapted to move into the path of this projection when the lever 154 is swung to the position shown in dotted outlines in Fig. 6, and it will be readily understood that if the said lever is so swung when the slide is in its highest position the hook will interlock with the projection 168 and prevent the slide from descending. When at its lowest position the end of the slide extends into the path of the roller 94 on the release frame end 91, and as the can bearing link passes the slide the said roller will engage the inclined face of a block 160ª secured thereto and release the dog 83 by sliding the release frame longitudinally.

The operation of the machine, described in a general way is as follows:—The endless belt of links or can carriers moves at a uniform rate in the direction of the arrow. A comparatively large number of the links are provided in order that a sufficient length of time will elapse after the cans are charged before arriving at the testing point to permit an appreciable amount of air to escape in case the leak should be comparatively slight. As the links pass underneath the feed chute the cans are automatically deposited therein in the manner previously described. As there is more or less play between the loosely connected links provision is made for steadying the belt or conveyer to prevent lateral motion, especially at points where the charging and emptying of the cans take place. This is accomplished by arranging guide rails 79ª alongside the belt at the proper places, said rails being adapted to engage the ends of the plungers and keep them in line. Immediately following the deposit of the can in the cradle of the link the convex end 79 of the plug 78 is engaged by an inclined face 170, formed on the guide rail 79ª and this pushes the plunger inward until the dog 83 engages the slot 86. At the same time the end of the opposite head 49 is engaged by an inclined face 170ª on the corresponding rail 79ª, thus clamping the can firmly between the disks 55 and 77 as previously described and illustrated in Figs. 4 and 6. Upon arriving opposite the charging head 110, the convex faces 68, 68ª, will mutually engage with sufficient force to compress the elastic cushions 62, 62ª, and open the valves 64, 64ª. It will be understood that the pipe 111 is connected with a supply of air under pressure, so that as soon as the said valves open the air will enter the can through the ducts or channels 71, 71ª. One purpose of the conical depressions forming mouths for the said ducts is to increase the duration of the communication between the ducts 71, 71ª, so that the uniform movement of the links will not cut off the air supply too soon. There is an airtight sliding fit between the contacting faces of the parts 68—110 adjacent the conical openings 70, 70ª, so that air in passing from the duct 71ª to the duct 71, will not escape, and the meeting edges of said parts are slightly beveled to prevent said parts from becoming interlocked as they meet during the travel of the can carriers past the air-charging member. After being thus charged with air under a given amount of pressure, the cans pass around the sprockets at the rear of the machine and travel back toward the front along the lower course until reaching the location of the rotary valve 115. This valve is in constant rotation through the action of the gearing hereinbefore described, and as it revolves the tips of the radial nipples engage successively with the conical mouths 70 of the ducts 71, forming an air tight connection, at the same time that the plunger 48 is pressed inward by contact of the nut 67 with an inclined face 171, thus opening the valve 64, and allowing the air confined in the can to pass through the connecting tube and press upward upon the plunger 138. The stem of the plunger being in contact with the rock-lever 152 any amount of upward movement of the plunger will be imparted through the various connections to the detent lever 154, and the hook 156 will be swung toward the slide the amount of movement depending upon the degree of pressure in the cavity of the plunger 138. The springs 147 and 157 are previously adjusted so that the initial pressure of the air introduced with the can at the charging point, will be just adequate to carry the hook 156 into the path of the projection 168 on the release slide 160. As a consequence of this relative adjustment, the hook will swing to its engaging position only when there has been no leakage in the can, and as the can releasing slide will thus be rendered inoperative, the perfect can will be retained in its seat and passed along until it reaches a second release point, where the roller on the release frame will engage the inclined face of a block 172 causing the said frame to move in its slideway and trip the dog 83, whereupon the spring will retract the plunger and release the can. In case, however, the can should prove defective, by the time it has reached the discharging valve a certain amount of air will have escaped and as a consequence there will not be sufficient pressure to lift the plunger to the limit of its stroke and the detent lever will move only slightly, if at all, and since there will be no hindrance to the drop of the slide the latter will descend to its full extent bringing the cam block 160ª on its lower end into the path of the roller and releasing the dog 83 in the same manner as described for the fixed incline, so that the defective cans will all be discarded at a point distinct from that for discharging the perfect cans. As the dogs 83 are invariably tripped at one of the discharging points, each unit or link in the conveyer is empty as it passes up over the sprocket wheels at the front end of the machine and is thus in condition to receive another can as it passes under the feed chute.

Having thus described my invention what I claim as new, is:—

1. In a can-testing machine, a main supporting frame, an endless conveyer mounted to travel on said frame, can-clamping means on said conveyer comprising two clamping members one of which is adapted to admit air to a can on said conveyer, means for conducting air to said clamping member, a latch on the other clamping member adapted to hold the latter in operative position, and means for releasing said latch, said means operable through the reduction of the air pressure in a can.

2. In a can-testing machine, a main supporting frame, a can chute on said frame, an endless conveyer mounted on said frame, can-clamping means on said conveyer, said means comprising two clamping members, one of which is adapted to admit air to a can on said conveyer, valve-controlled means for conducting air to said clamping member, a latch on the other clamping member adapted to hold the latter in operative position, means on said frame for releasing said latch when said clamping devices are at one position on the frame, and means for releasing said latch when the clamping devices are at another position on the frame, said last named means operable through the reduction of the air pressure in a can.

3. In a can-testing machine, a conveyer composed of a plurality of can-holding units flexibly connected, each of said units comprising a cradle adapted to support a can, two clamping heads arranged on said cradle and adapted to engage opposite ends of the can, one of said heads having an air-passage therethrough and the other head adjustable, valve-controlled devices on said cradle for admitting air to said air-passage and means on said cradle for locking the adjustable head in operative position, in combination with means for operating the valve-controlled devices on the cradle to conduct air to said passage, and means for operating said valve-controlled devices to permit the air to return through said passage.

4. In a can-testing machine, a main supporting frame, a plurality of can holding units flexibly connected to form an endless conveyer traveling on said frame, each of said units comprising a cradle adapted to support a can, two yielding heads arranged at opposite ends of said cradle, one of said heads having an air passage therethrough and the other being adjustable relative to said air-passage head, means on said cradle for locking said adjustable head in operative position, a self-closing valve arranged in the head having the air-passage and controlling said passage, means for operating said valve to admit air to said passage, means for operating said valve to release the air from said passage, said last means including air conducting means, and can releasing means communicating with said air-conducting means and operatively controlled through the pressure of the air therein.

5. In a can-testing machine, can-holding means having an air passage therein, a self-closing valve controlling said passage, means for conducting air under pressure to said passage, said means having an air conduit therein and comprising a valve adapted to operate the first named valve to admit air to the passage and means for operating said first named valve to release the air from said passage, said means adapted to conduct the air from said passage, and can releasing means communicating with said air-conducting means and operatively controlled by the air therein.

6. In a can testing machine, can holding means comprising a clamping head having an air passage therethrough, a valve seated in said head, controlling said passage and having one end extending from said head, means for conducting air to said passage, said means comprising a member having an air passage therethrough and a valve seated in said member, controlling said passage and projecting from said member, said valves adapted to be opened through contact with each other.

7. In a can testing machine, a supporting frame, can holding means adapted to support a can and having clamping heads, one of which is provided with an air-passage therethrough, and a valve controlling said passage, and means for conducting air to said passage, said means having a sliding contact with the outer end of said head, adapted to open the valve in said head and having an air-passage registering with the air passage in the clamping head.

8. In a pneumatic can-testing machine, means for introducing air under pressure to the cans, said means comprising a can-clamping member having an air passage therethrough, a yielding valve normally closing said passage, and means for operating said valve, said means comprising a cushioned member connected with said valve, and means for operating said cushioned member.

9. In a pneumatic can-testing machine, means for introducing air under pressure to the cans, said means comprising a can holding and clamping member having an air passage therethrough, a yielding valve normally closing said passage, and means for operating said valve, said means comprising a cushioned member connected with said valve, means for conducting air under pressure to said passage, and a cushioned valve mounted in said air conducting means and adapted to operate the cushioned member of the first-named valve.

10. In a can-testing machine, a can holding unit comprising clamping heads, one of said heads having an air-passage therethrough, a self-closing valve mounted in said head, controlling said passage and having a portion projecting from said head, means for opening said valve by depressing the projecting portion thereof, and means having an air-conducting passage therein adapted to register with the air passage in said head.

11. In a can-testing machine, can-holding means comprising a frame, clamping heads carried by said frame, a pawl adapted to engage one of said heads and lock it in clamping position, the other of said heads having an air-passage therein, in combination with a member having an air-chamber adapted to communicate with the air passage in said head, and means, including a piston in said chamber for controlling said locking pawl through the pressure of air in said chamber.

12. In a can-testing machine, can holding means comprising a frame, two clamping heads carried by said frame, one of said heads having an air-passage therein, and a pawl adapted to lock the other of said heads in clamping position, in combination with a member having an air chamber adapted to communicate with the air passage in said head, and means, including a piston in said chamber, a movable cam adapted to release said pawl, and connections between said cam and piston for controlling said locking pawl through the pressure of air in said chamber.

13. In a can-testing machine, can holding means comprising a frame, two clamping heads supported by said frame, one of said heads having an air-passage therein, and a pawl adapted to lock the other head in clamping position, in combination with a member having an air chamber therein, a valve connecting said chamber with said air passage, a piston in said chamber, a movable cam and connections adapted to release said pawl, and means connecting said cam and piston whereby the pawl will be controlled through the pressure of the air in said chamber.

14. In a can-testing machine, can holding means comprising a plurality of connected frames, two clamping heads on each frame, one of said heads having an air passage therethrough, means for locking one of said heads in clamping position, in combination with means for conducting air to said air passage, means for releasing the head locking means, said releasing means comprising a movable valve having a plurality of ports adapted to be brought successively into communication with said air passage, an air receiving chamber communicating with said valve, a piston mounted in said chamber, and means controlled by said piston adapted to engage said locking means.

15. In a can-testing machine, can holding means comprising a plurality of hingedly connected frames, two clamping heads on each of said frames, one of said heads having a valve controlled air passage therethrough, means on said frame for locking the other head in clamping position, in combination with means for conducting air under pressure to said air passage, and means for conducting air from said passage, both of said means comprising resilient members, valves and air passages, and said passages adapted to be brought into communication with the air passage in said clamping head when the valve controlling said air passage is in open position.

16. In a can-testing machine, a can-holder comprising clamping heads, one of which has an air passage therethrough, means controlling said passage consisting of a double conical valve adapted to be opened by the compression of one portion of the valve and to be closed by the expansion of said portion, means for compressing said valve and means for conducting air to said air-passage.

In testimony whereof I affix my signature in the presence of two witnesses.

JOHN E. McCULLOUGH.

Witnesses:
M. A. MILORD,
F. BENJAMIN.